March 14, 1950   F. DE JAGER ET AL   2,500,807
MODULATION CIRCUIT
Filed Aug. 3, 1948
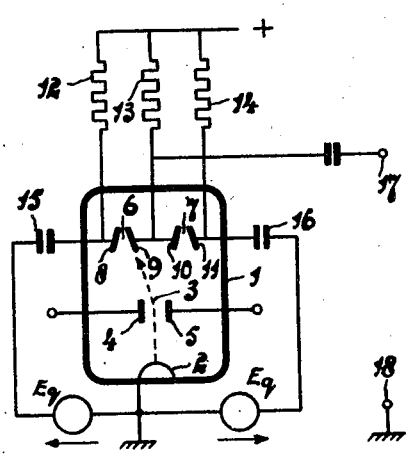
FRANK DEJAGER
HENDRIK VAN DE WEG
INVENTORS
BY
AGENT Patented Mar. 14, 1950

2,500,807

UNITED STATES PATENT OFFICE 2,500,807

MODULATION CIRCUIT

Frank de Jager and Hendrik van de Weg, Eindhoven, Netherlands, assignors to Hartford National Bank and Trust Company, Hartford, Conn., as trustee Application August 3, 1948, Serial No. 42,248
In the Netherlands September 29, 1947

3 Claims. (Cl. 332—65)

The present invention relates to a circuit arrangement for modulating an oscillatory wave with a signal voltage.

It is known that for causing a signal to modulate an auxiliary oscillation, as required, for example, in carrier-wave telephony, it is common practice to use a circuit-arrangement comprising a plurality of non-linear elements, such for example as selenium rectifiers, which in this case are usually arranged as ring modulators or balanced modulators.

In order to avoid undesirable modulation products with such circuit-arrangements it is necessary for the conducting and the non-conducting phases of the rectifiers to be controlled, at least substantially, by the auxiliary oscillation, and this leads in practice to a reduction in amplitude of the modulation signal down to from 20 and 30% of the amplitude of the auxiliary oscillation.

Moreover, by using selenium rectifiers both the amplitude of the modulation signal and that of the auxiliary oscillation are restricted by the comparatively low permissible operating voltage.

Preventing the auxiliary oscillation from appearing in the output voltage of the modulator circuit generally requires accurate selection of rectifiers, which even then will not be identical, so that frequently a given grouping must still be carried out.

These known modulators furthermore require transformers which are as far as possible symmetrical and which, if desired, might be replaced by resistances, considerable losses of energy occurring, however, in these resistances.

Finally, the high parallel capacity of the selenium rectifiers used is a source of considerable trouble.

The circuit-arrangement according to the invention obviates the aforesaid disadvantages and exhibits the feature that the auxiliary oscillation is fed to the deflecting means of a cathode-ray tube, which comprises two control-paths each of which is formed by two secondary-emission collecting electrodes, to which a direct voltage is supplied by galvanic means, one of the collecting electrodes of one control-path being electrically connected to one of the collecting electrodes of the other control-path and the signal being fed in phase-opposition to the two other collecting electrodes.

In order that the invention may be more clearly understood and readily carried into effect, it will now be described more fully with reference to the accompanying drawing.

The cathode-ray tube 1, which is shown diagrammatically, comprises a cathode 2, several electrodes (not shown) operating to form a cathode-ray beam 3, a set of deflecting plates 4 and 5 and, in addition, two control-paths 6 and 7, formed by the pairs of secondary-emission collecting electrodes 8, 9 and 10, 11 respectively.

The secondary-emission electrodes 9 and 10 are electrically interconnected, and are connected through resistance 13 to a positive direct voltage, and electrodes 8 and 11 are connected through resistances 12 and 14, respectively, to said positive direct voltage.

The signal $E_q$, which is required to modulate the auxiliary oscillation, is fed in phase-opposition, through blocking condensers 15 and 16 to the secondary-emission collecting electrodes 8 and 11, whereas the auxiliary oscillation is fed to the deflecting plates 4 and 5, so that the cathode-ray beam 3 alternately strikes the electrodes of the control-paths 6 and 7.

If, at a given instant, at which the beam 3 strikes the control-path 6, the potential at the collecting electrode 8 is increased under the action of a variation of the voltage $E_q$, secondary electrons will travel from electrode 9 to electrode 8 with the result that the control-path formed by the space between the electrodes 8 and 9 tends to form a conductive connection.

This connection is interrupted as soon as the cathode-ray beam is changed over, under the action of the auxiliary oscillation fed to the deflecting plates 4 and 5, to the position in which the control-path 7 is connected into the circuit.

A commutation of the input voltage $E_q$ is thus periodically effected with the use of the cathode-ray beam at a frequency equal to that of the auxiliary oscillation, so that across the output terminals 17, 18 a modulation product may be obtained, the form of which is similar to that of the conventional modulation circuits.

If, in addition, for example, the signal voltage $E_q$ is replaced by a direct voltage source, the electric centre of which is connected to the cathode of the tube 1, a block-shaped alternating voltage occurs across the output, owing to the periodical commutation by means of the cathode-ray tube.

Since the cutting-off phase and the conductive phase of the control-paths are not determined by sum and difference voltages of auxiliary oscillation and signal, as in the case of the well known circuit-arrangements, it will be obvious that the modulation signal may be chosen to be appreciably higher in relation to the amplitude of the auxiliary oscillation.

Transformers are not essential in the circuit-arrangement according to the invention but for obtaining the supply of the signal voltage $E_q$ in phase-opposition use may be made of a transformer.

The circuit-arrangement according to the invention permits of preventing the occurrence of the auxiliary oscillation in the output signal, the so-called carrier-wave leak, in a considerably more effective manner than used to be the case in the known circuit-arrangement and in addition parallel capacities do not constitute a source of trouble.

What we claim is:

1. In a circuit arrangement for modulating an oscillatory wave with a signal voltage whereby said wave is suppressed in the output thereof, the combination comprising a cathode ray tube provided with means to generate a primary electron beam, means to deflect said beam along a given line, first and second secondary-electron emissive electrodes positioned in spaced relation on either side of one point in said line to intercept said beam, and third and fourth secondary-electron emissive electrodes positioned on either side of another point in said line to intercept said beam, said second and third electrodes being interconnected, means to impress constant positive potentials on the respective electrodes of said tube to establish a bilateral control path between said first and second electrodes and between said third and fourth electrodes, means to apply the signal voltage to said first and fourth electrodes in phase opposition, means to apply the oscillatory wave to said deflecting means to reciprocate said beam along said line in accordance with said wave, and output means to derive the resultant modulation components from said interconnected second and third electrodes.

2. In a circuit arrangement for modulating an oscillatory wave with a signal voltage whereby said wave is suppressed in the output thereof, the combination comprising a cathode ray tube provided with means including a cathode to generate a primary electron beam, a pair of deflecting plates to displace said beam along a given line, first and second secondary-electron emissive electrodes positioned in spaced relationship on either side of one point in said line and angularly oriented to intercept said beam, and third and fourth secondary electron emissive electrodes positioned on either side of another point in said line and angularly oriented to intercept said beam, said second and third electrodes being interconnected, means to impress constant positive potentials on the respective electrodes of said tube to establish a bilateral control path between said first and second electrodes and between said third and fourth electrodes, means to apply the signal voltage to said first and fourth electrodes in phase opposition, means to apply the oscillatory wave to said deflecting means to reciprocate said beam along said line in accordance with said wave, and output means to derive the resultant modulation components from said interconnected second and third electrodes.

3. In a circuit arrangement for modulating an oscillatory wave with a signal voltage whereby said wave is suppressed in the output thereof, the combination comprising a cathode ray tube provided with means including a cathode to generate a primary electron beam, a pair of deflecting plates to displace said beam along a given line, first and second secondary-electron emissive electrodes positioned in spaced relation on either side of one point in said line and angularly oriented to intercept said beam, third and fourth secondary-electron emissive electrodes positioned in spaced relation on either side of another point in said line and angularly oriented to intercept said beam, said second and third electrodes being interconnected, means to apply the signal voltage between said cathode and said first and fourth electrodes in phase opposition, first, second and third impedances, means to apply a constant positive potential through said first impedance to said first electrode, through said second impedance to the interconnection of said second and third electrodes and through said third impedance to said fourth electrode to establish a bilateral control path between said first and second electrodes and between said second and third electrodes, means to apply the oscillatory wave to said deflection plates to reciprocate said beam along said line in accordance with said wave, and an output circuit coupled to said second impedance to derive the resultant modulation components therefrom.

FRANK DE JAGER.
HENDRIK VAN DE WEG.

REFERENCES CITED

The following references are of record in the file of this patent:

UNITED STATES PATENTS

| Number | Name | Date |
| --- | --- | --- |
| 2,190,069 | Hollmann | Feb. 13, 1940 |
| 2,269,688 | Roth | Jan. 13, 1942 |
| 2,307,074 | Pray et al. | Jan. 5, 1943 |